United States Patent [19]

Sommazzi et al.

[11] Patent Number: 5,734,010
[45] Date of Patent: Mar. 31, 1998

[54] PROCESS FOR THE PREPARATION OF COPOLYMERS OF CARBON MONOXIDE AND AT LEAST ONE COMPOUND CONTAINING AN ALKENYL UNSATURATION

[75] Inventors: Anna Sommazzi, S. Margherita Ligure; Fabio Garbassi, Novara; Giovanni Mestroni, Trieste; Barbara Milani, Gorizia, all of Italy

[73] Assignee: Enichem S.p.A., Milan, Italy

[21] Appl. No.: 825,159

[22] Filed: Mar. 26, 1997

[30] Foreign Application Priority Data

Apr. 18, 1996 [IT] Italy .................. MI96A0743

[51] Int. Cl.⁶ ............................................ C08G 67/02
[52] U.S. Cl. .................. 528/392; 528/392; 524/701; 524/707; 524/709; 524/712; 502/102; 502/103; 502/202; 502/208
[58] Field of Search ............... 528/392; 524/701, 524/707, 709, 712; 502/102, 103, 202, 208

[56] References Cited

U.S. PATENT DOCUMENTS 5,218,085  6/1993  De Jong et al. .................. 528/392
5,420,236  5/1995  Keijsper et al. .................. 528/392

*Primary Examiner*—Samuel A. Acquah
*Attorney, Agent, or Firm*—Oblon, Spivak, McClelland, Maier & Neustadt, P.C.

[57] ABSTRACT

Linear alternating copolymers of carbon monoxide and at least one compound containing an alkenyl unsaturation are obtained by reaction between carbon monoxide and at least one compound containing an alkenyl unsaturation, in a solvent which is liquid under the operating conditions, in the presence of a preformed bischelated catalyst having general formula (I) active without cocatalysts:

$$[Pd(chel)(chel')]^{++}[A^-]_2 \qquad (I)$$

wherein: chel and chel', the same or different, represent a nitrogenated or phosphorated bidentate chelating agent, and $A^-$ represents an essentially non-co-ordinating, non-esterifiable and non-labile anion selected from $(3,5\text{-}(CF_3)_2\text{-}C_6H_3)_4B^-$, tetra(perfluorophenyl)borate $B(C_6F_5)_4^-$ and $Al(C_6F_5)_4^-$.

26 Claims, No Drawings

PROCESS FOR THE PREPARATION OF COPOLYMERS OF CARBON MONOXIDE AND AT LEAST ONE COMPOUND CONTAINING AN ALKENYL UNSATURATION

The present invention relates to a process for the preparation of linear alternating copolymers of carbon monoxide and at least one compound containing an unsaturation of the alkenyl type which uses a catalyst active without cocatalysts.

Various catalytic processes are known in the art, for the polymerization of mixtures of carbon monoxide (CO) and one or more olefins suitable for producing linear copolymers in which the CO/olefin unit is alternately repeated. The polymerization can be carried out in gas phase or in liquid phase in polymerization diluents, preferably methanol, in the presence of suitable catalytic systems.

The catalytic systems generally used in these processes derive from the combination of:

1) a salt of a metal belonging to the eighth group of the periodic table;
2) a bidentate base, generally consisting of an alkyl or cycloalkyl hydrocarbon symmetrically substituted by two dialkylphosphinic or diphenylphosphinic groups or by two groups containing at least one nitrogen atom; and
3) an anion of an acid, preferably an acid with a pKa of less than 2.

These catalytic systems are, for example, described in patents EP-121.965, EP-222.454, EP-257.663, EP-305.012.

These processes of the known art however have disadvantages deriving from the fact that the catalytic systems require the presence of strong acids as cocatalysts (for example $CF_3COOH$, p-toluene sulfonic acid) which, apart from creating problems of a technological nature, for example corrosion of the reactors, tend to become englobed in the polymer reducing its properties. In addition their anions are co-ordinating, for example $CF_3COO^-$ and p-toluenesulfonate, or labile such as for example $BF_4^-$.

To overcome the above drawbacks a process has recently been proposed for the preparation of CO/ethylene copolymers which is based on the use of preformed complexes of palladium which contain two nitrogenated or phosphorated bidentate chelating agents per palladium atom and two non-esterifiable or almost non-esterifiable, non-co-ordinating, non-labile anions, active without the acid cocatalyst (U.S. Pat. No. 5,310,871).

The above catalytic systems however generally have low productivities and require the presence of a fourth component selected from compounds belonging to the group of quinones, organic oxidants or aromatic nitro-compounds, preferably 1,4'-benzoquinone, to increase the polymerization productivity expressed as Kg of polymer produced per gram of metal per hour.

The presence of hydroquinone however, produced by the reduction of 1,4'-benzoquinone, generally causes the formation of copolymers with a lower molecular weight (LVN) (Barsacchi, M. et al., Angew. Chem. Int. Ed. Engl. (1991), 30:, 989) and the decomposition of the catalyst to metal palladium which remains englobed in the copolymer reducing its characteristics.

It has now been found that it is possible to overcome the disadvantages of the known art described above by the process of the present invention which is based on the use of a preformed catalytic complex active without cocatalysts.

Operating according to the process of the present invention, it is possible to prepare linear alternating copolymers of carbon monoxide and at least one compound containing an unsaturation of the alkenyl type with high yields and good molecular weights.

In accordance with this, a first aspect of the present invention relates to a process for the preparation of linear alternating copolymers of carbon monoxide and at least one compound containing an unsaturation of the alkenyl type which comprises, reacting in a solvent which is liquid under the operating conditions, the carbon monoxide and one or more compounds containing an unsaturation of the alkenyl type in the presence of a preformed bischelated catalyst active without cocatalysts having general formula (I)

$$[Pd(chel)(chel')]^{++}[A^-]_2 \qquad (I)$$

wherein: chel and chel', the same or different, represent a nitrogenated or phosphorated bidentate chelating agent, and $A^-$ represents an anion selected from $(3,5-(CF_3)_2-C_6H_3)_4B^-$, tetra(perfluorophenyl)borate $B(C_6F_5)_4^-$ and $Al(C_6F_5)_4^-$.

Examples of nitrogenated bidentate chelating agents can be selected from those having general formula (II):

$$\underset{N}{\overset{X}{\diagdown}}\underset{\phantom{=}}{=}C-C\underset{\phantom{=}}{=}\overset{Y}{\diagup}N \qquad (II)$$

wherein: X and Y, the same or different, represent a bridged organic group having at least three atoms in the bridge of which at least two are carbon atoms. When, as well as the carbon atoms, the X and Y groups contain other atoms, these are preferably nitrogen or oxygen atoms.

Preferred nitrogenated bidentate chelating agents according to the present invention are those in which the bridging groups X and Y are equal and contain from 3 to 10 atoms at least two of which are carbon atoms.

Examples of nitrogenated chelating agents are: 2,2'-bipyridyl (bipy); 4,4'-dimethyl-2,2'bipyridyl (DM-bipy); 4,4'-diphenyl-2,2'-bipyridyl (DP-bipy); 5,5'-dimethyl-2,2'-bipyridyl; 5-methyl-2,2'-bipyridyl; 6,6'-dimethyl-2,2'-bipyridyl; 1,10-phenanthroline(phen); 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline (TM-phen); 4,4'-dimethyl-5,5'-bioxazole; 2,2'-bipyrimidine.

Phosphorated bidentate chelating agents are selected from those having general formula (III):

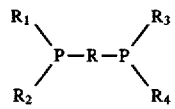

wherein: R represents an alkyl radical with from 2 to 4 carbon atoms, a cycloalkylidene radical with from 2 to 10 carbon atoms or an orthophenylene radical; $R_1-R_4$ the same or different, each represent a $C_1-C_{10}$ alkyl, $C_3-C_{10}$ cycloalkyl radical or a $C_6-C_{12}$ aromatic radical optionally substituted with a $C_1-C_4$ alkyl or alkoxyl radical.

Non-limiting examples of phosphorated bidentate chelating agents suitable for the purposes of the present invention are selected from: 1,3-bis(diphenylphosphine)propane (DPPP), 1,3-bis(di-4-methoxy-phenylphosphine)propane, 1,4-bis(dicyclohexylphosphine)butane and 1,2-bis(diphenylphosphine)cyclohexane.

In the catalysts having general formula (I), $A^-$ is an essentially non-co-ordinating, non-esterifiable, non-labile anion selected from $B(C_6F_5)_4^-$, $(3,5-(CF_3)_2-C_6H_3)_4B^-$ and $Al(C_6F_5)_4^-$. $B(C_6F_5)_4^-$ is preferred for the purposes of the present invention.

Examples of catalysts having general formula (I) in which the nitrogenated chelating groups are equal are:
$[Pd(bipy)_2]^{++}[B(C_6F_5)_4^-]_2$, $[Pd(phen)_2]^{++}[B(C_6F_5)_4^-]_2$, $[Pd(bipy)_2]^{++}[Al(C_6F_5)_4^-]_2$, $[Pd(phen)_2]^{++}[Al(C_6F_5)_4^-]_2$.

Examples of catalysts having general formula (I) in which the chelating groups are different are:
$[Pd(DPPP)((bipy)]^{++}[B(C_6F_5)_4^-]_2$,
$[Pd(phen)((bipy)]^{++}[B(C_6F_5)_4^-]_2$,
$[Pd(DPPP)((bipy)]^{++}[Al(C_6F_5)_4^-]_2$ and
$[Pd(phen)((bipy)]^{++}[Al(C_6F_5)_4^-]_2$.

The catalysts having general formula (I) of the present invention can be prepared using the process described in the patent U.S. Pat. No. 5,310,871.

According to an embodiment of the process of the present invention, when chel and chel' are the same and represent a nitrogenated chelating agent, the catalysts (I) can be prepared with a simple and economical process according to the following scheme:

$$Pd(CH_3COO)_2 + 2[chel''H^+][A^-] \rightarrow [Pd(chel'')_2][A^-]_2 + 2\ CH_3COOH$$

wherein chel" has the same meaning as chel and chel' and $A^-$ is an anion selected from $B(C_6F_5)_4^-$, $(3,5\text{-}(CF_3)_2\text{-}C_6H_3)_4B^-$ and $Al(C_6F_5)_4^-$.

Monomers containing an alkenyl unsaturation which are suitable for the purposes of the present invention comprise compounds which consist exclusively of carbon and hydrogen and compounds which additionally comprise one or more heteroatoms, such as unsaturated esters. Unsaturated hydrocarbons with from 2 to 12 carbon atoms are preferred.

Examples of these compounds are olefins such as ethylene, propylene, 1-butene, isobutylene, 1-pentene, 1-hexene, 1-octene, 1-dodecene or cyclic compounds such as cyclopentene or aromatics such as styrene, p-methyl-styrene, m-methyl-styrene, p-ethyl-styrene, m-isopropyl-styrene, norbornene. Ethylene, propylene, styrene, 1-hexene or their mixtures, are preferred for the purposes of the present invention.

Examples of suitable solvents in the process of the present invention are methanol, ethanol, 2,2,2-trifluoroethanol and their mixtures.

In the process of the present invention the molar ratio between carbon monoxide and the monomers containing an alkenyl unsaturation is generally between 1:10 and 1:5, preferably between 1:1 and 1:2.

The quantity of catalyst (I) used in the process of the present invention can vary within wide limits. Generally a quantity of catalyst is used which is such as to give a concentration of gram-atoms of palladium per mole of compound containing an alkenyl unsaturation of between $10^{-8}$ and $10^{-1}$, preferably between $10^{-6}$ and $10^{-3}$.

The process of the present invention can be carried out, optionally, in the presence of an organic oxidant selected from quinones, aliphatic nitriles, nitroaromatic derivatives or air. The preferred oxidant is 1,4-benzoquinone.

The organic oxidant, when used, is used in a quantity preferably of between 10 and 400 moles per gram-atomic weight of palladium.

The polymerization is generally carried out at temperatures of between 20° and 150° C. and at a pressure of between 1 and 200 bars. It is convenient to operate at a temperature of between 30° and 100° C. and at a pressure of not more than 100 bars.

At the end of the polymerization the copolymer is recovered, with the usual separation techniques, in the form of a white solid with a medium molecular weight expressed as intrinsic viscosity (LVN) of between 0.1 and 5 dl/g, preferably between 0.2 and 4 dl/g. The LVN (Limiting Viscosity Number) is measured in m-cresol at 100° C. according to the method ASTM D2857-70 (1977).

The copolymers thus obtained can be characterized by means of analytical techniques such as NMR and FT-IR. The results of these analyses confirm that the copolymers obtained with the process of the present invention have a linear alternating structure. In addition these copolymers have a high molecular weight (LVN) and a low concentration of catalytic residues.

These copolymers can be used in specialized fields in particular structural applications for example car panels, plastic films and in the field of packaging.

The following illustrative but non-limiting examples provide a better understanding of the present invention.

EXAMPLE 1

Synthesis of $[Pd(DPPP)(bipy)][B(C_6F_5)_4]_2$ 0.1 g ($1.33 \times 10^{-1}$ mmoles) of $[Pd(DPPP)(CF_3COO)_2]$ and 0.03 g ($1.6 \times 10^{-1}$ mmoles) of Bipy (Pd:bipy=1:1.2) are charged at room temperature into a 100 ml glass flask containing 10 ml of methanol. 0.24 g of N,N-dimethylaniliniumtetra(perfluorophenyl)borate ($Pd:B(C_6F_5)_4^-$=1:2.2) are added to the dark yellow solution thus obtained and maintained, under stirring, at room temperature for 20 minutes. 2 ml of water are then added dropwise and the precipitation of the product is activated by grating the bottom of the flask with a glass rod. After 20 minutes under stirring at room temperature, a white solid is separated by filtration at the vacuum pump, which is then washed and dried under vacuum (yield 88%).

Elemental analysis calculated values: C, 50.21%; H, 1.69%; N, 1.38% resulting values: C, 49.5%; H, 1.49%; N, 1.35%

0.4 mmoles of the white solid obtained as described above are subsequently dissolved in 35 ml of methanol, the solution is filtered on paper, and 7 ml of water are added to the filtrate. The resulting solution is maintained at room temperature, under stirring, for 30 minutes. The precipitated product is then recovered by filtration and is dried under vacuum.

Elemental analysis calculated values: C, 50.21%; H, 1.69%; N, 1.38% resulting values: C, 50.2%; H, 1.57%; N, 1.36%

EXAMPLE 2

Synthesis of the CO/Ethylene Copolymer 1.2 liters of methanol, 0.05 mmoles of $[Pd(DPPP)(bipy)][B(C_6F_5)_4]_2$, 4 mmoles of 1,4-benzoquinone and a mixture of CO/ethylene (1:1), are charged into a 3 liter pressure-resistant reactor up to a pressure of 56 atms. After 5 hours of reaction at 80° C., the reactor is cooled to room temperature and the non-reacted gas is discharged. The copolymer is recovered by filtration, washed with methanol and dried at 60° C. under vacuum. 292 g of alternating linear copolymer are obtained, resulting from NMR analysis, corresponding to 55 kg of copolymer per g of palladium. The copolymer has a LVN of 1.1 dl/g and a content of Pd equal to 15 ppm.

EXAMPLE 3

The same procedure is carried out as in example 2, but without 1,4-benzoquinone. 219 g of alternating linear copolymer rae obtained, resulting from NMR analysis, corresponding to 41 Kg of CP/g Pd. The copolymer has a LVN of 1.05 dl/g and a content of Pd equal to 16 ppm.

EXAMPLE 4

Synthesis of CO/Ethylene/Propylene Terpolymer

The same procedure is carried out as in example 2, but introducing into the reaction mixture 50 g of propylene. 127 g of alternating linear terpolymer are obtained, resulting from NMR analysis, corresponding to 23.9 Kg of B TP/g Pd. The terpolymer has a LVN of 0.64 dl/g and a content of Pd equal to 27 ppm.

EXAMPLE 5 (COMPARATIVE)

The same procedure is carried out as in example 2, but using 0.05 mmoles of $[Pd(DPPP)(bipy)][PF_6]_2$ as catalyst. 131 g of alternating copolymer are obtained, corresponding to 24.6 Kg of CP/g Pd. The copolymer has a LVN of 1.02 dl/g and a content of Pd equal to 17 ppm.

EXAMPLE 6 (COMPARATIVE)

The reaction is carried out as described in example 5, but without 1,4-benzoquinone. 105 g of alternating copolymer are obtained, corresponding to 19.7 Kg of CP/g Pd. The copolymer has a LVN of 1.00 dl/g and a content of Pd equal to 18 ppm.

EXAMPLE 7 (COMPARATIVE)

The same procedure is carried out as in example 5, but in the presence of 0.05 mmoles of cocatalyst $|bipyH^+||PF_6^-|$. 255 g of alternating copolymer are obtained, corresponding to 47.93 Kg of CP/g Pd. The copolymer has a LVN of 1.1 dl/g and a content of Pd equal to 14 ppm. These results indicate that the use of $B(C_6F_5)_4^-$ as anion produces a catalyst whose activity is more than doubled with respect to the catalyst having $PF_6^-$ as anion. The activity Of the catalyst of the present invention is surprisingly high even without an oxidant (comparative examples 3 and 6).

We claim:

1. A process for the preparation of linear alternating copolymers of carbon monoxide and at least one compound containing an unsaturation of the alkenyl type which comprises reacting, in a solvent which is liquid under the operating conditions, the carbon monoxide and one or more compounds containing an unsaturation of the alkenyl type in the presence of a catalyst active without cocatalysts having general formula (I)

[Pd(chel)(chel')]$^{++}$[A$^-$]$_2$  (I)

wherein: chel and chel', the same or different, represent a nitrogenated or phosphorated bidentate chelating agent, and A$^-$ is an essentially non-co-ordinating, non esterifiable and non-labile anion selected from $(3,5\text{-}(CF_3)_2\text{-}C_6H_3)_4B^-$, $B(C_6F_5)_4^-$ and $Al(C_6F_5)_4^-$.

2. The process according to claim 1, characterized in that the nitrogenated bidentate chelating agents are selected from those having general formula (II)

wherein: X and Y, the same or different, represent bridged organic groups each having at least three atoms in the bridge, of which at least two are carbon atoms.

3. The process according to claim 2, wherein when, in addition to the carbon atoms, the X and Y groups contain other atoms these are selected from oxygen and nitrogen.

4. The process according to claim 3, characterized in that the nitrogenated bidentate chelating agents have the same bridging groups X and Y and contain from 3 to 10 atoms of which at least two are carbon atoms.

5. The process according to claim 2, characterized in that the nitrogenated bidentate chelating agents are selected from 2,2'-bipyridyl; 4,4'-dimethyl-2,2'bipyridyl; 4,4'-diphenyl-2, 2'-bipyridyl; 5,5'-dimethyl-2,2'-bipyridyl; 5-methyl-2,2'-bipyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'-bioxazole; 2,2'-bipyrimidine.

6. The process according to claim 1, characterized in that the phosphorated bidentate chelating agents are selected from those having general formula (III):

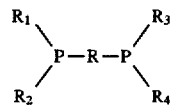

wherein: R represents an alkyl radical with from 2 to 4 carbon atoms, a cycloalkylidene radical with from 2 to 10 carbon atoms or an orthophenylene radical; $R_1$-$R_4$ the same or different, each represent a $C_1$-$C_{10}$ alkyl, $C_3$-$C_{10}$ cycloalkyl radical or a $C_6$-$C_{12}$ aromatic radical possibly subsituted with a $C_1$-$C_4$ alkyl or alkoxyl radical.

7. The process according to claim 6, characterized in that the phosphorated bidentate chelating agents are selected from 1,3-bis(diphenylphosphine)propane; 1,3-bis(di-4-methoxy-phenylphosphine)propane; 1,4-bis(dicyclohexylphosphine)butane and 1,2-bis(diphenylphosphine)cyclohexane.

8. The process according to claim 1, characterized in that A$^-$ is $(B(C_6F_5)_4^-)$.

9. The process according to claim 1, characterized in that it additionally contains an organic oxidant selected from quinones, aliphatic nitriles, nitroaromatic derivatives and organic peroxides.

10. The process according to claim 9, characterized in that the organic oxidant is 1,4-benzoquinone.

11. The process according to claim 1, characterized in that the compound containing the alkenyl unsaturation is selected from olefins such as ethylene, propylene, 1-butene, isobutylene, 1-pentene, 1-hexene, 1-octene, 1-dodecene or a cyclic compound such as cyclopentene or an aromatic such as styrene, p-methyl-styrene, m-methyl-styrene, p-ethyl-styrene, m-isopropyl-styrene, norbornene or their mixtures.

12. The process according to claim 1, characterized in that the solvent is selected from methanol, ethanol and 2,2,2-trifluoro-ethanol or their mixtures.

13. The process according to claim 1, characterized in that the molar ratio between the compound containing the alkenyl unsaturation and the carbon monoxide is between 1:10 and 1:5.

14. The process according to claim 13, characterized in that the molar ratio is between 1:1 and 1:2.

15. The process according to claim 1, characterized in that the quantity of catalyst (I) is such as to give a concentration of gram-atoms of palladium per mole of compound containing an unsaturation of the alkenyl type of between $10^{-6}$ and $10^{-1}$.

16. The process according to claim 9, characterized in that the quantity of organic oxidant is between 10 and 400 moles per gram-atoms of palladium.

17. The process according to claim 1, characterized in that the polymerization reaction is carried out at a temperature of between 20° and 150° C. and at a pressure of between 1 and 200 bars.

18. The process according to claim 20, characterized in that the temperature is between 30° and 100° C. and the pressure is not higher than 100 bars.

19. A preformed bischelated catalyst active without cocatalyst having general formula (I)

  (I)

wherein: chel and chel', the same or different, represent a nitrogenated or phosphorated bidentate chelating agent, and $A^-$ is an essentially non-co-ordinating, non esterifiable and non-labile anion selected from $(3,5\text{-}(CF_3)_2\text{-}C_6H_3)_4B^-$, $B(C_6F_5)_4^-$ and $Al(C_6F_5)_4^-$, which can be used in a process for the preparation of alternating linear copolymers based on carbon monoxide and at least one compound containing an alkenyl unsaturation.

20. The catalyst according to claim 19, characterized in that the nitrogenated bidentage chelating agent is selected from those having general formula (II)

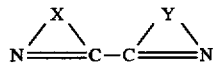  (II)

wherein: X and Y, the same or different, represent bridged organic groups each having at least three atoms in the bridge, of which at least two are carbon atoms.

21. The catalyst according to claim 20, wherein when, in addition to the carbon atoms, the X and Y groups contain other atoms these are selected from oxygen and nitrogen.

22. The catalyst according to claim 21, characterized in that the nitrogenated bidentate chelating agents have the same bridging groups X and Y and contain from 3 to 10 atoms of which at least two are carbon atoms.

23. The catalyst according to claim 19, characterized in that the nitrogenated bidentate chelating agents are selected from 2,2'-bipyridyl; 4,4'-dimethyl-2,2'bipyridyl; 4,4'-diphenyl-2,2'-bipyridyl; 5,5'-dimethyl-2,2'-bipyridyl; 5-methyl-2,2'-bipyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'-bioxazole; 2,2'-bipyrimidine.

24. The catalyst according to claim 19, characterized in that the phosphorated bidentate chelating agents are selected from those having general formula (III):

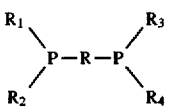

wherein: R represents an alkyl radical with from 2 to 4 carbon atoms, a cycloalkylidene radical with from 2 to 10 carbon atoms or an orthophenylene radical; $R_1$-$R_4$ the same or different, each represent a $C_1$-$C_{10}$ alkyl, $C_3$-$C_{10}$ cycloalkyl radical or a $C_6$-$C_{12}$ aromatic radical possibly subsituted with a $C_1$-$C_4$ alkyl or alkoxyl radical.

25. The process according to claim 24, characterized in that the phosphorated bidentate chelating agents are selected from 1,3-bis(diphenylphosphine)propane; 1,3-bis(di-4-methoxy-phenylphosphine)propane; 1,4-bis(dicyclohexylphosphine)butane and 1,2-bis(diphenylphosphine)cyclohexane.

26. The catalyst according to claim 19, characterized in that $A^-$ is $B(C_6F_5)_4^-$.

* * * * *

UNITED STATES PATENT AND TRADEMARK OFFICE
CERTIFICATE OF CORRRECTION

PATENT NO. : 5,734,010
DATED : March 31, 1998
INVENTOR(S) : Sommazzi et al

Page 1 of 3

It is certified that error appears in the above-identified patent and that said Letters Patent is hereby corrected as shown below:

On the title page, item [56] insert

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 5059678 | 10/22/91 | VAN BROEKHOVEN, et al. | | | |
| | 5468708 | 11/21/95 | COOLEY, et al. | | | |
| | 5654487 | 8/05/97 | COOLEY, et al. | | | |
| | | | | | | |

UNITED STATES PATENT AND TRADEMARK OFFICE
CERTIFICATE OF CORRRECTION

PATENT NO. : 5,734,010  
DATED : March 31, 1998  
INVENTOR(S) : Sommazzi et al

Page 2 of 3

It is certified that error appears in the above-identified patent and that said Letters Patent is hereby corrected as shown below:

On the title page, item [56] insert

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 1 | 0 | 8 | 7 | 1 | 05/10/94 | Anna SOMMAZZI et al. | | | |
| | | 5 | 3 | 1 | 4 | 8 | 5 | 6 | 05/24/94 | Anna SOMMAZZI et al. | | | |
| | | 5 | 3 | 2 | 4 | 7 | 0 | 1 | 06/28/94 | Anna SOMMAZZI et al. | | | |
| | | 5 | 4 | 0 | 8 | 0 | 3 | 0 | 04/18/95 | Anna SOMMAZZI et al. | | | |
| | | 5 | 5 | 5 | 6 | 8 | 2 | 3 | 09/17/96 | Anna SOMMAZZI et al. | | | |
| | | | | | | | | | | | | |

UNITED STATES PATENT AND TRADEMARK OFFICE
CERTIFICATE OF CORRRECTION

PATENT NO. : 5,734,010  
DATED : March 31, 1998  
INVENTOR(S) : Sommazzi et al Page 3 of 3

It is certified that error appears in the above-identified patent and that said Letters Patent is hereby corrected as shown below:

On the title page, item [56] insert

FOREIGN PATENT DOCUMENTS

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | | 6 | 1 | 9 | 3 | 3 | 5 | 10/12/94 | EP | | | | |
| | | | | | | | | | | | | | |

Signed and Sealed this

Sixth Day of April, 1999

Attest:

Attesting Officer

Q. TODD DICKINSON

Acting Commissioner of Patents and Trademarks